July 19, 1932. M. C. DELLINGER 1,867,657
FOOD CHOPPER
Filed Dec. 26, 1930 3 Sheets-Sheet 1
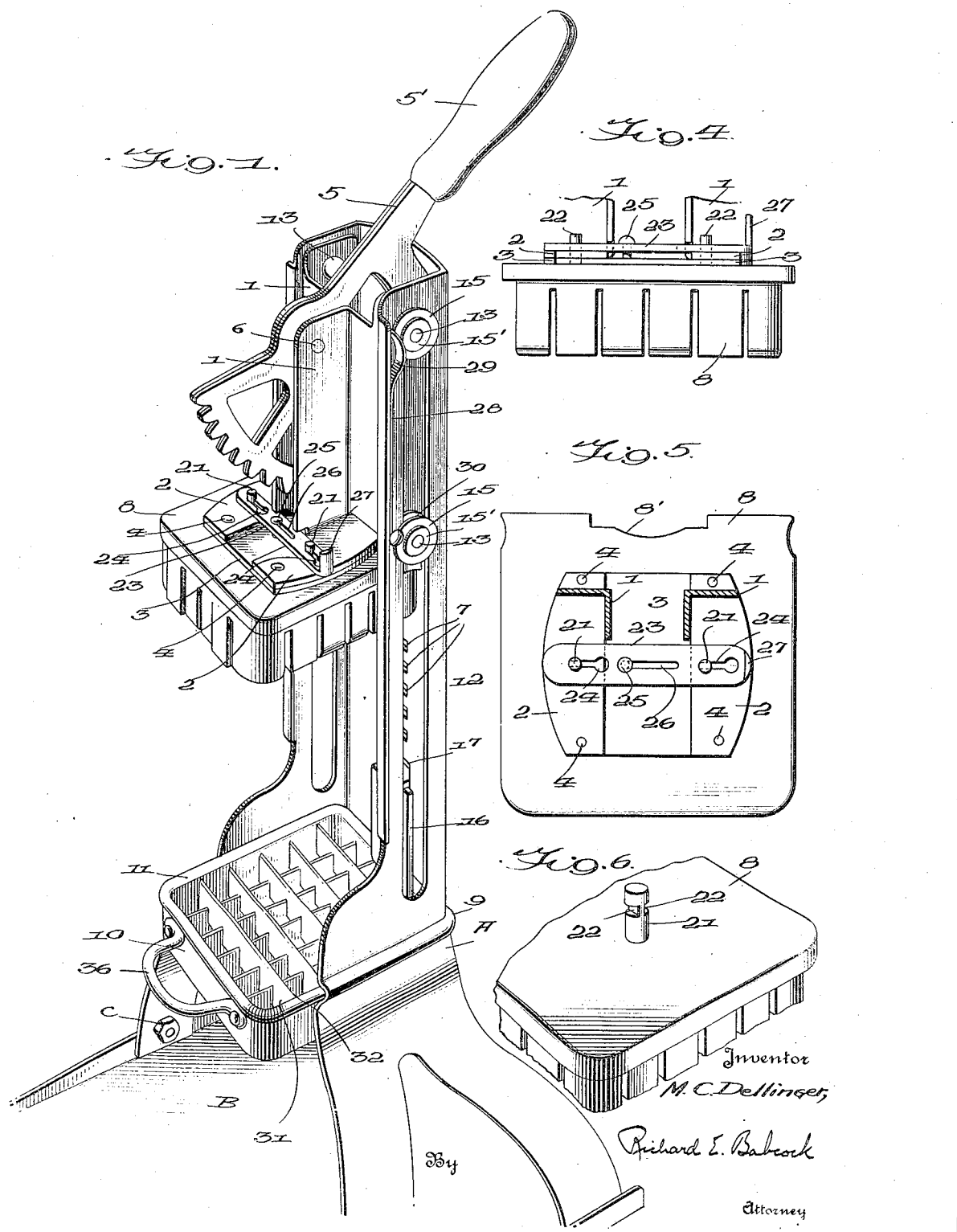

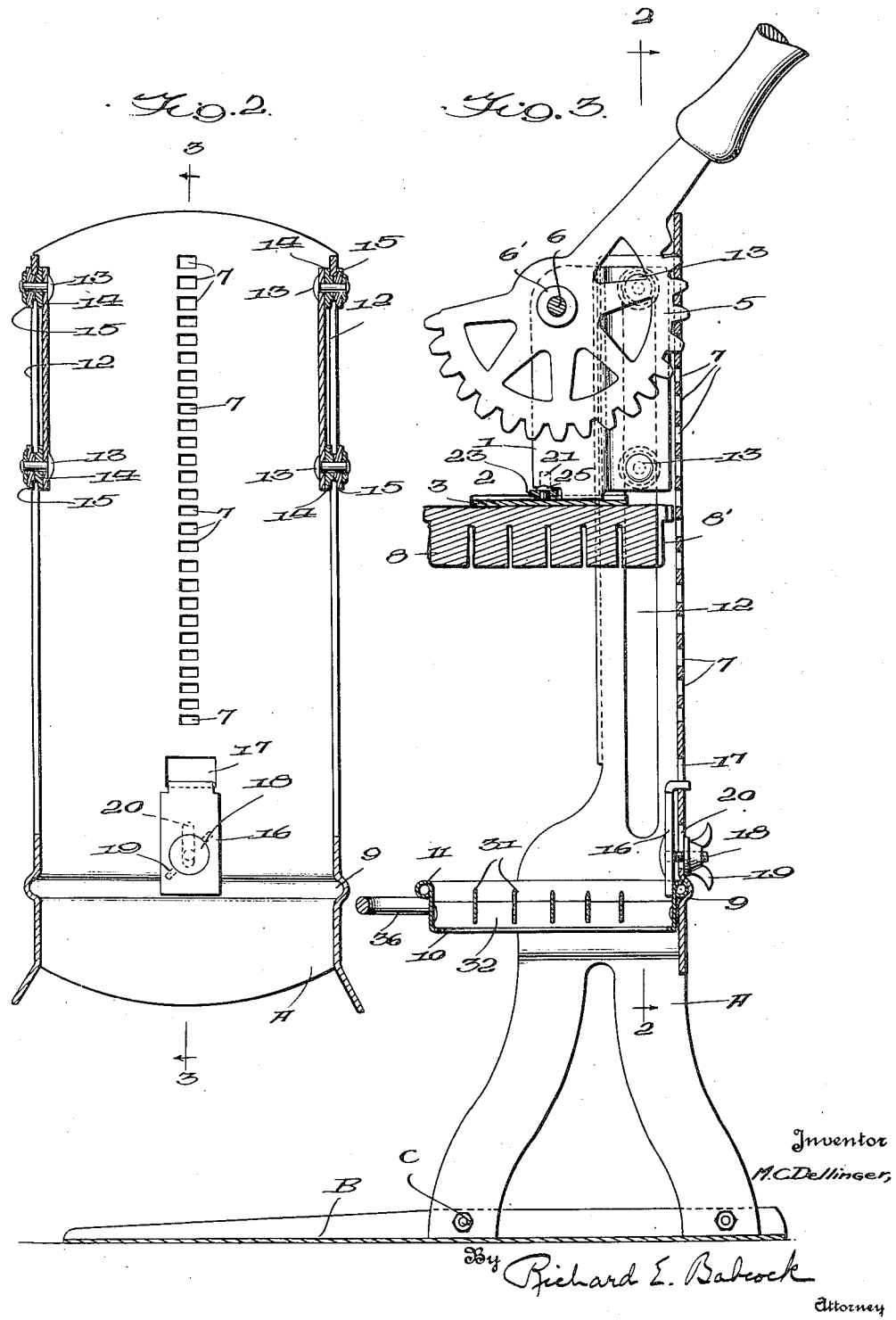

July 19, 1932.  M. C. DELLINGER  1,867,657
FOOD CHOPPER
Filed Dec. 26, 1930   3 Sheets-Sheet 3
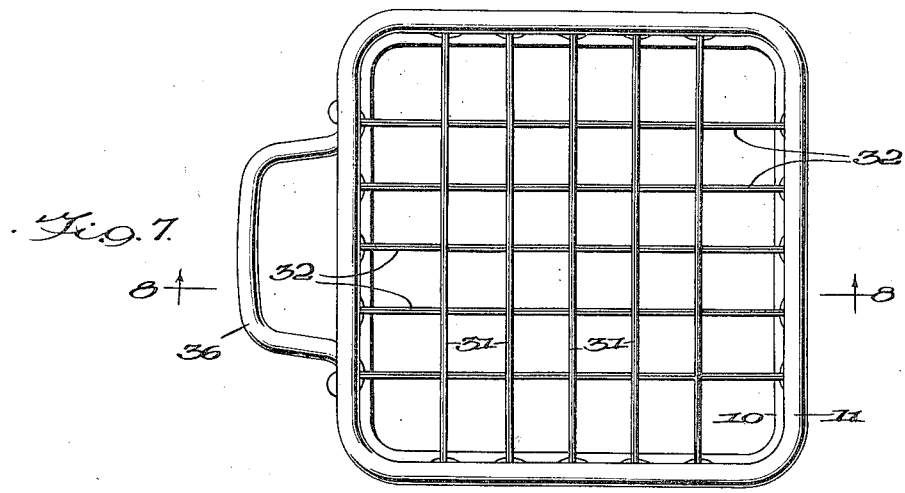
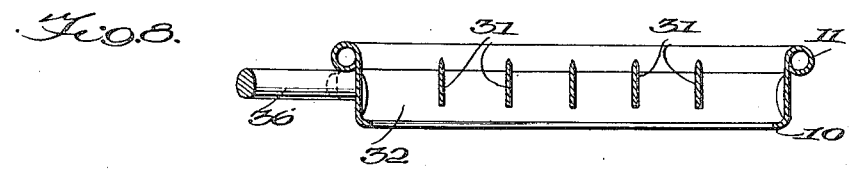
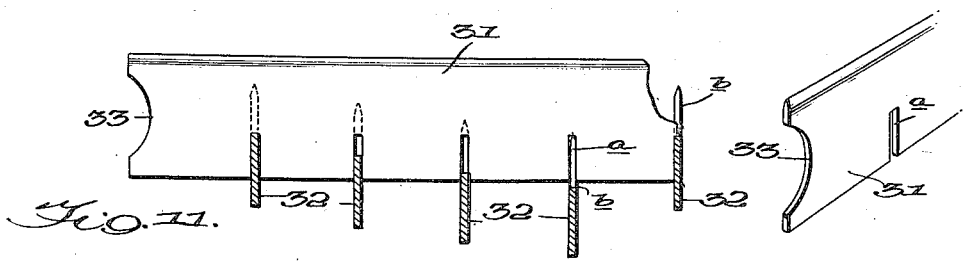
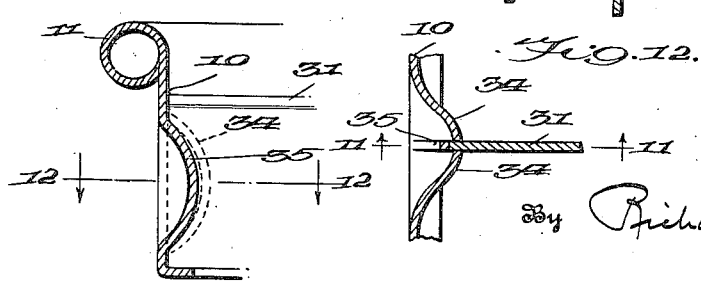
Inventor
M. C. Dellinger,
By Richard E. Babcock
Attorney

Patented July 19, 1932

1,867,657

UNITED STATES PATENT OFFICE

MARTIN C. DELLINGER, OF LANCASTER, PENNSYLVANIA, ASSIGNOR OF ONE-HALF TO HARRY W. KULP, OF LANCASTER, PENNSYLVANIA

FOOD CHOPPER

Application filed December 26, 1930. Serial No. 504,956.

This invention relates to food choppers and has primarily in view the slicing, dicing, and cutting of vegetables such as potatoes, cabbage, etc., though it is equally well adapted for use in chopping up or dicing meats.

The primary objects in view are to provide a chopper which shall be very rapid in operation; to provide in such a chopper leverage for facilitating the expeditious chopping of the food; to provide in such a chopper for the quick interchanging of cooperating parts to adapt the device to cut the food into varying sizes; to provide a device of this nature which shall peculiarly lend itself to production by sheet metal stamping operations; to provide a very simple and strong construction of cutter element, and to provide a new and simple method of assembling the knives in the holding frame of the cutter element.

Additional objects are to provide means for preventing jamming of the movable parts; to provide means for yielding holding of the presser block in raised position; to provide simple means for holding the cutter element in operative position certainly in registry with the presser block; and to otherwise simplify and improve devices of this type.

In this application I show and describe only the preferred embodiment of my invention simply by way of illustration of the practice of my invention, as by law required. However, I am well aware that my invention is capable of other and different embodiments, and that the various details thereof may be modified in a number of ways all without departing from my said invention; therefore, the drawings and description herein are to be considered as merely illustrative and not as exclusive.

In the accompanying drawings:

Figure 1 represents a perspective view of a food chopper embodying my invention;

Figure 2, a vertical, sectional view thereof on the line 2—2 of Figure 3, the handle, presser block, cutter element and lower portions of the stand or frame being omitted;

Figure 3, a vertical, sectional view on line 3—3 of Figure 2, showing handle, presser block, cutter element and lower part of the stand;

Figure 4, a fragmentary detail front elevation of the presser block and the adjacent portion of the carriage to which it is attached;

Figure 5, a fragmentary top plan view of Figure 4;

Figure 6, a fragmentary perspective view of the presser block;

Figure 7, an enlarged top plan view of a cutter element;

Figure 8, a sectional view on the line 8—8 of Figure 7, looking in the direction of the arrows;

Figure 9, a fragmentary enlarged view of one of the knives 31, showing the knives 32 in various stages of association therewith;

Figure 10, a fragmentary detailed perspective view of one of the knives 31;

Figure 11, a fragmentary, sectional view on the line 11—11 of Figure 12, looking in the direction of the arrows, and showing knife 31 in elevation;

Figure 12, a sectional view on the line 12—12 of Figure 11, looking in the direction of the arrows.

Referring now in detail to the drawings, A designates a vertical stand, B a flat supporting base secured to the legs of the stand by any suitable means, such as short bolts with cooperating nuts as indicated at C, or by rivets or any other usual fastening; the base C being of considerable length, preferably equal to about three-fourths of the height of the stand A so as to give a long base to prevent tipping over of the device as a whole and also to provide a large tray to receive the chopped food which may drop from the cutter element.

The upper portion of the frame A above its diverging legs is of the elongated U shape in cross section and each leg or side of the frame is provided with a long guide slot 12, and associated with the upper part of the frame A to slide vertically thereof and guided therein, is a carriage consisting of two sheet metal plates 1, having their lower ends bent at a sharp angle to extend at right angles in a horizontal direction and being connected together by means of a tie-plate 3 secured to said flanges or plates 2 adjacent each corner by rivets 4 to make a very strong construction. Each plate 1 has a portion extending parallel with the adjacent side or leg of said frame A and at a point approximately flush with the front portions or edges of the side frame 1, each said plate 1 is sharply bent toward the other side of the frame 1 to a point adjacent the center of said frame A, and is there again sharply bent at right angles so as to extend in offset relation and parallel to its first mentioned portion, said last mentioned portions of the two plates extending preferably parallel to each other and being spaced at such distance as to receive the gear lever 5 mounted between them on the rivet pin 6, which has the dual function of serving as a fulcrum for said gear lever 5, and securing the upper portions of said plates 1 to each other. The presser block 8 is removably or detachably associated with the above described carriage mechanism, being held against the lower face of the tie-plate 3.

The frame A is formed equi-distant from its sides with a gear rack to receive and cooperate with the teeth of the gear lever 5, said rack being formed by cutting out the middle of the frame at regular intervals, as at 7 as illustrated in Figures 2 and 3.

The lower portion of the frame A is formed with a horizontal guide groove 9 to slidably and interchangeably receive any one of a plurality of interchangeable cutter elements such as 10, having an outwardly presented bead 11 to fit and slide in said groove, a clamp plate 16, hooked through a perforation 17 in the frame A and adapted to be drawn up tight by means of a nut 19 turning on a bolt 18 extending through a slot 20 in the rear of the frame A and extending down to engage the element 10, serves to lock the element 10 in normal operative position in the frame. Of course, any other suitable means functioning to the same end as the elements 16, 17, 18, 19 and 20 may be employed, the construction illustrated being merely one of a number of possible suitable constructions and preferred by me as a very simple and efficient mechanical expedient for this purpose.

Preferably a pair of double rollers 14 and 15 will be mounted by means of stud pivots 13 respectively adjacent the respective upper and lower ends of each of the plates 1, and will be so formed as that each of the wheels 15 and 14 will have a part disposed in the respective cooperating slots 12 and a flange extending over the adjacent face of the corresponding side of the frame 1, so as to guide the carriage as a whole in proper position and prevent jamming or misalignment thereof. By this construction undue friction will be avoided and the respective wheels 14 and 15 of each pair of guide wheels may turn in opposite directions, or in the same direction according as may be necessary or most efficient, depending on their frictional contact with one side or the other of the respective sides or legs of frame A. The stud pivots 13 will of course have enlarged heads engaging the inner face of the respective plates 1 and may have washers 15' applied on their outer ends upset against said washers, in accordance with known practice in this respect.

The presser block 8 may be detachably, interchangeably associated with the carriage in any one of a number of different ways suitable to the purpose and well known. To this end, I have shown as one suitable construction, studs 21 which may be integral with the presser block 8, extending vertically therefrom in spaced relationship and formed with transverse notches 22, said studs 21 being adapted to extend through registering perforations in the tie-plate 3 and flanges or extensions 2 of the plates 1, so as to project with their slotted portions 22 above the upper face of the latter flanges. A slide 23 having bayonet shaped slots or keyhole slots 24 formed in the end portions thereof is slidably mounted on the plate 3 by means of a rivet 25 mounted in the plate 3 and disposed in a slot 26 of the plate 23, so as to slide against the upper faces of the flanges 2 in a direction transverse of the device as a whole. In one position said slide 23 is adapted to receive the studs 21 in the larger portions or heads of said bayonet or keyhole slots 26 respectively, and in the other extreme position engages in the slots 22 of said studs 21 to hold the presser block 8 firmly against the tie-plate 3. To facilitate the movement of this locking plate 23, the same may be formed with an end lug 27 to be gripped or pushed upon by the operator.

To hold the carriage and presser block 8 in raised position, as when removing the cutter element 10, or inserting a different interchangeable cutter element 10, or for any other purpose, leaf springs 28 will be mounted on the frame A and will have their extreme upper ends respectively formed with sudden or abrupt curves respectively presenting cam-faces against the respective upper wheels 15, so that as the carriage is raised to its extreme upper position said upper wheels 15 will engage the respective yielding spring cams 29 and flatten the same out until said wheels have passed beyond the center of said cams which will then spring back into normal condition, wherein they will extend into the pathway of said upper wheels 15, and will hold them in such extreme upper position until sufficient pressure is exerted on the carriage to flatten out said portions 29 and permit the carriage to descend. Said springs 28 may be held to the frame A by means of screws 30 respectively. The frame A will have preferably each of its sides or legs formed with outwardly oppositely presented flanges and said springs 28 will lie flatly for most of their lengths against said flanges respectively except for the abrupt cam portions 29, the extreme upper end of which will preferably bear lightly against their cooperating flanges as mentioned, and said springs 28 will extend between the screws 30 respectively.

Each presser block 8 is slotted in two or more directions so that the slots intersect with each other to form between said slots depending blocks corresponding in cross sectional outlines and dimension to the mesh of, or spaces defined by the knives of the cutter element 10, so that the blocks of the presser block will surely register with and fit between the knives of the cutter element 10 so as to force the food to be chopped against the edges of said knives and through said cutter element 10, without any portion of the presser block 8 striking against or damaging the knife edges.

While in this application only one size of mesh of cutter element and one size or space of the slots in the presser block 8 have been illustrated, this invention has particularly in view the interchangeable use of a plurality of sets of presser blocks 8 and cutter elements 10, ranging from any desired small mesh of cutter element 10, with corresponding small sizes of block of the cooperating presser block 8 of a set, to any extreme larger size of mesh of cutter element 10 with corresponding extreme larger sizes of blocks of the cooperating pressing block 8 of such set. However, since the structural details would be exactly the same throughout the various sizes of meshes of the cutter elements 10 and of the blocks of the pressing blocks 8, it is not seen that it would be of any advantage to add a number of additional views to show the range of possible different sizes, the only difference being in the increase of the number of knives employed thereto in a given element 10 and in the number of blocks in the pressing block 8, or in their decrease, in accordance with the size of resulting chopped food desired. Obviously, such other views to show different sizes would be merely repetition and would not add anything to the case.

The cutter element 10 has special novel features of construction, in which the knives 31 extend across the knives 32 and each knife 31 is notched as at $a$ to register with the notches $b$ in the upper edge portions of blades 32, so that each blade 31 has a plurality of notches $a$ each receiving a portion of each or the knives or blades 32 and likewise is received in a notch in each of the blades 32 the length of each pair of cooperating notches of the blades 31 and 32 being of such length that the edges of the knives 31 will be disposed slightly above the edges of the knives 32, so that the material will first be cut by the edges of the knives 31 before engaging the edges of the knives 32 to be cut at right angles thereby. An important construction or feature of this cutter element is involved in the mounting or connection of the knives 31 and 32 in or with the frame of the cutting element 10. Instead of attempting to weld the knives 31 and 32 in place or to secure them by riveting or otherwise, I form each end of each knife with an arcuate notch 33. I cut the frame 10 to form a vertical strap 35 in registry with each end of each blade 31 or 32 and strike up or bend in the material to form a lug 34 on each side of each strap 35 to define between the opposite edge faces of each pair of said lugs 34 a guideway to slidably receive the adjacent end portion of its corresponding knife 31 or 32 as the case may be and to have said edge faces substantially in engagement with the opposed faces of said blades. As thus formed, the blades 31 and 32 may be freely slid into correct position in the frame 10 and be held against movement in any direction at an angle to that of their direction of insertion. Having thus inserted the knives 31 and 32 in the frame as thus prepared, I then bend the straps 35, as illustrated in Figures 11 and 12, so as to extend into the curved end portions 33 of the blades so as to firmly hold them against movement in either direction edgewise of said blades. Thus said blades will be held by said straps 35 at each end against movement in an edgewise direction and by the edges of portions 34 against movement in any lateral direction.

Preferably the gear lever 5 will be provided with a suitable handle such as 5′ and may be spaced from the plates 1 by washers 6′ disposed about the pivot pin 6 and interposed between the respective plates 1 and the opposed faces of the gear lever 5. The gear lever 5 may be formed from sheet metal by either being stamped from very heavy sheet metal or by being made of laminated construction, the gear lever 5 illustrated being constructed from two duplicate sheet metal stampings preferably welded together to form one operatively integral element.

In operation, the potato, cabbage, piece of meat, or other article of food will be placed on top of the knives 31 and 32 of the cutter element 10 and the gear lever 5 will be rocked forwardly about its pivot 6 so that its teeth will engage successively from top to bottom with the rack bars of the rack formed by the perforations 7, exerting great leverage on the presser block 8 to press against such article of food to force it against the knife blades and through the cutter element 10. Partial rotation or rocking movement of the gear lever 5 in the reversed direction will result in progressively engaging the teeth of the gear lever with the cross bars of the rack from the bottom to the top thereof, so raising the pressing block 8 to initial position wherein the curved parts 29 of the springs 28 will engage the outer upper wheels 15 to hold the carriage in raised position until the gear lever is again rocked forward by hand. Such pressing of the food article against and through the cutter element 10 will result in cutting the said article into a plurality of long strips cut in cross section. If it be desired to dice them such strips will be recovered from beneath the cutter element 10 and will be again placed on the cutter element 10 lengthwise, so that when the pressing element 8 forces them against the knives 31 and 32 the same will be cut at right angles to their length and so divided into a number of cubes.

If it be desired to change the set comprising the cutter element 10 and the cooperating similar size pressing block 8, this may be done by moving the lock bar 23 laterally to release the studs 21, when the pressing block 8 will drop out of position, and by loosening the nut 19 on the screw 20 to allow the clamping plate 16 to be moved up so that the cutting element 10 may be pulled by the handle 36 from the stand or frame A. When said pressing block 8 and cutting element 10 have thus been removed, the interchangeable set comprising the pressing block 8 and the cutting element 10 of the desired size or mesh may be selected and secured in position in the frame and on the carriage as above mentioned.

Of course the pressing block 8 will be so formed and related to the frame and to the cutter element 10 that it may be moved toward the same to such degree that the lower face will extend at least as far down as the lower edges of the knives 31 and 32, and where a clamping means such as the plate 16 and bolt or screw 18 is employed to lock the cutter element 10 in position of registry with the pressing block 8, said pressing block will have its rear edge portion medially cut out as at 8' to receive said plate 16 and the head of the screw or bolt 18, to the end that said parts may not interfere with the full operative stroke of said pressing block 8.

Obviously for use in comminuting food stuffs, or in ricing potatoes or for squeezing or extruding fruit or vegetable juices and/or pulp and for similar purposes a set or plurality of sets of cooperating elements each is comprising a presser block and a food stuff supporting element may be provided in the set of attachments provided for the device as a whole, and said pressing block provided for this purpose will preferably have its bottom or operative face of unbroken area, that is not slotted, and the food supporting element for this purpose may be of perforated sheet metal, or may have its bottom of strong wire of suitable mesh, and of course in either instance said food supporting element will be dished and of such size and shape as to receive the pressing block.

Having thus described my invention, what I claim as new and desire to secure by Letters Patent is:

1. A food chopper comprising a guideway of channel form and having parallel vertical sides formed with registering vertical guide slots, a carriage extending between the sides of said guideway and having side portions of substantial vertical length disposed closely adjacent, and substantially parallel, to said sides of said guideway, studs mounted in the upper and lower end portions of each of said carriage sides and projecting outwardly through the corresponding guide slots of the respective sides of the guideway, a pair of guiding and antifriction rollers mounted in opposed relation on each stud, each roller of each said pair of rollers being formed with a reduced portion to engage the edge walls of its slot and with a flange portion to engage the corresponding opposed face of the corresponding side of said guideway adjacent the slot thereof, a pressing block carried by said carriage, a cutting element adapted to receive the food stuff to be operated upon and operatively rigidly held and supported in the path of movement of said pressing block, in combination with means for causing movement of said carriage endwise of said guideway.

2. A food chopper comprising a stand, a vertical guideway of channel form having parallel vertical sides formed with registering vertical guide slots, a carriage extending between the sides of said guideway and having side portions of substantial vertical length disposed closely adjacent, and substantially parallel, to said sides of said guideway, studs mounted in the upper and lower end portions of each of said carriage sides and projecting outwardly through the corresponding guide slots at the respective sides of the guideway, a pair of guiding and antifriction rollers mounted in opposed relation on each said stud, each roller of each said pair of rollers being formed with a reduced portion to engage the edge walls of its slot and with a flange portion to engage the corresponding opposed face of the corresponding side of said guideway adjacent the slot thereof, a pressing block carried by said carriage, means for detachably securing said block to said carriage, a cutting element adapted to receive the food stuff to be operated upon and operatively rigidly held and supported by said stand in the path of movement of said pressing block, and means for detachably securing said cutting element in said stand, in combination with a rack rigid with said guideway, a gear lever pivotally mounted on said carriage and formed with gear teeth engaging said rack to cause movement of said carriage endwise of said guideway in accordance with the direction of movement of said gear lever about its pivot, and yielding means for holding said carriage in raised position.

3. A food chopper comprising a stand, a vertical guideway of channel form rigid with said stand and having parallel vertical sides formed with registering vertical guide slots, flanges extending outwardly in opposite directions from the respective sides of said frame at a sharp angle relative to said sides respectively and rigid therewith, a carriage extending between the sides of said guideway and having side portions of substantial vertical length disposed closely adjacent, and substantially parallel, to said sides of said guideway, studs mounted in the upper and lower end portions of each of said carriage sides and projecting outwardly through the corresponding guides slots of the respective sides of the guideway, a pair of guiding and anti-friction rollers mounted in opposed relation on each said stud, each roller of each said pair of rollers being formed with a reduced portion to engage the edge walls of its slot and with a flange portion to engage the corresponding opposed face of the corresponding side of said guideway adjacent the slot thereof, a pressing block carried by said carriage, means for detachably securing said block to said carriage, a cutting element adapted to receive the food stuff to be operated upon and operatively rigidly held and supported by said stand in the path of movement of said pressing block, and means for detachably securing said cutting element in said stand, in combination with a rack rigid with said guideway, a gear lever pivotally mounted on said carriage and formed with gear teeth engaging said rack to cause movement of said carriage endwise of said guideway in accordance with the direction of movement of said gear lever about its pivot, leaf springs lying against said flanges and having abruptly bent yielding upper portions adapted to engage the peripheries of the respective outer upper guide wheels when raised to their extreme upper position, and means for securing said springs in such position.

4. An element for supporting and separating material comprising a metal frame having a pair of opposed inwardly bent lugs having their opposed edges in spaced relation, and a strap integral with said frame and disposed between the opposed edges of said lugs and having its side edges extending in the same direction as the edges of said lugs, and in planes parallel to said edges of said lugs, in combination with a member extending across said frame and having an end portion disposed between said lugs with its respective side faces engaged by the respective opposed edges of said lugs, the extreme end face of said member being notched and said strap extending into the notch in said end portion to prevent edgewise movement of said member.

5. A cutter element comprising a sheet metal frame, a plurality of pairs of opposed lugs integral with said frame and having opposed spaced operative edges, and a plurality of anchoring straps integral with said frame and respectively disposed between the lugs of the respective pairs of lugs, in combination with a corresponding plurality of knives having their extreme end edges formed with notches, the respective end portions of said knives fitting between the opposed edges of the respective cooperating pairs of lugs and being engaged thereby, and the respective straps being so formed as to extend into the notches of the respective cooperating end portions of the respective knives to prevent edgewise withdrawal of said knives from between the respective lugs.

6. A cutter element comprising a sheet metal frame, a plurality of pairs of opposed lugs integral with said frame and having opposed spaced operative edges, and a plurality of anchoring straps integral with said frame and respectively disposed between the lugs of the respective pairs of lugs, in combination with a corresponding plurality of knives having their extreme end edges formed with arcuate notches, the respective end portions of said knives fitting between the opposed edges of the respective cooperating pairs of lugs and being engaged thereby, and the respective straps being so formed as to extend into the notches of the respective cooperating end portions of the respective knives to prevent edgewise withdrawal of said knives from between the respective lugs.

In testimony whereof, I have signed my name to this specification at Lancaster, Pennsylvania, this 28th day of November, 1930.

MARTIN C. DELLINGER.